US009790910B2

(12) United States Patent
Quinteros

(10) Patent No.: US 9,790,910 B2
(45) Date of Patent: Oct. 17, 2017

(54) SYSTEM AND METHOD FOR PREVENTING UNWANTED ENGINE RESTARTS WHILE PARKING A VEHICLE

(71) Applicant: Toyota Motor Engineering & Manufacturing North America, Inc., Erlanger, KY (US)

(72) Inventor: Luis C. Quinteros, Los Angeles, CA (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 85 days.

(21) Appl. No.: 14/595,863

(22) Filed: Jan. 13, 2015

(65) Prior Publication Data

US 2016/0201633 A1 Jul. 14, 2016

(51) Int. Cl.
| | | |
|---|---|---|
| F02N 11/08 | (2006.01) | |
| F16H 63/50 | (2006.01) | |
| F16H 59/44 | (2006.01) | |
| F02P 3/02 | (2006.01) | |
| F02P 9/00 | (2006.01) | |

(52) U.S. Cl.
CPC ........ *F02N 11/084* (2013.01); *F02N 11/0822* (2013.01); *F02N 11/0837* (2013.01); *F16H 63/50* (2013.01); *B60W 2550/10* (2013.01); *F02N 11/0818* (2013.01); *F02N 11/0833* (2013.01); *F02N 2200/0802* (2013.01); *F02N 2200/102* (2013.01); *F02N 2200/12* (2013.01); *F02P 3/02* (2013.01); *F02P 9/002* (2013.01); *F16H 59/44* (2013.01); *F16H 2312/12* (2013.01); *F16H 2312/20* (2013.01)

(58) Field of Classification Search
None
See application file for complete search history.

(56) References Cited

U.S. PATENT DOCUMENTS

| | | |
|---|---|---|
| 4,500,794 A | 2/1985 | Hamano et al. |
| 5,314,038 A | 5/1994 | Peterson, Jr. |
| 5,451,820 A | 9/1995 | Gotoh et al. |
| 6,504,259 B1 | 1/2003 | Kuroda et al. |
| 7,224,088 B2 | 5/2007 | Shoemaker et al. |
| 7,552,705 B2 | 6/2009 | Serkh et al. |
| 8,157,705 B2 | 4/2012 | Yu et al. |
| 8,630,776 B2 | 1/2014 | Heap et al. |
| 8,690,731 B1 | 4/2014 | Sangameswaran et al. |

(Continued)

FOREIGN PATENT DOCUMENTS

| | | |
|---|---|---|
| CN | 102529855 | 7/2012 |
| CN | 203126839 | 8/2013 |

(Continued)

*Primary Examiner* — Robert A Siconolfi
*Assistant Examiner* — Ryan Dodd
(74) *Attorney, Agent, or Firm* — Snell & Wilmer LLP

(57) ABSTRACT

What is described is a system for controlling an engine of a vehicle. The system includes a gear shifter having a gear selection sensor configured to determine a selected gear position. The system also includes a proximity sensor configured to detect object data within a predetermined area of the vehicle. The system also includes a controller coupled to the gear shifter and the proximity sensor and configured to control the engine based on the selected gear position and the object data.

20 Claims, 11 Drawing Sheets

(56) References Cited

U.S. PATENT DOCUMENTS

| | | | |
|---|---|---|---|
| 8,781,714 B2 | 7/2014 | Kim et al. | |
| 2012/0138006 A1* | 6/2012 | Gwon | F02N 11/0818 123/179.4 |
| 2013/0032429 A1* | 2/2013 | Aimo Boot | B60K 6/48 180/422 |
| 2015/0252770 A1* | 9/2015 | Books | B60W 20/40 701/22 |

FOREIGN PATENT DOCUMENTS

| | | |
|---|---|---|
| DE | 102012217076 | 4/2013 |
| EP | 2148220 | 1/2010 |
| GB | 2466479 | 6/2010 |

* cited by examiner

| | 660 | 662 | 664 | 666 | 668 | 670 | 672 | 674 | 676 | 678 |
|---|---|---|---|---|---|---|---|---|---|---|
| SPEED BELOW THRESHOLD | N | Y | Y | Y | Y | Y | Y | Y | Y | Y |
| DRIVE/PARK/REVERSE | X | P | D | D | D | D | R | R | R | R |
| BRAKE REQUEST | X | X | N | N | Y | Y | Y | Y | N | N |
| OBJECT DETECTED | X | X | N | Y | N | Y | N | Y | N | Y |
| ENGINE ON/OFF | ON | OFF | ON | OFF/ON | OFF | OFF | OFF/ON | OFF | ON | OFF/ON |

FIG. 6B

SYSTEM AND METHOD FOR PREVENTING UNWANTED ENGINE RESTARTS WHILE PARKING A VEHICLE

BACKGROUND

1. Field

The present disclosure relates to a system and method for controlling an engine start/stop of a vehicle, and more particularly to a system and method for preventing unwanted engine restarts while parking a vehicle.

2. Description of the Related Art

Traditionally, internal combustion engines of vehicles remain on while the vehicle is in a stopped position. During this state, called "idling," the internal combustion engine continues to burn fuel. It may be unnecessary for the internal combustion engine to idle while the vehicle is in the stopped position, thus the fuel burned during the idle state may be wasted.

As a fuel saving measure, vehicle manufacturers have implemented an engine control technology known as a "start/stop" system. The start/stop system includes logic for turning off an internal combustion engine in certain situations in order to preserve fuel. For example, while a vehicle is in a stopped position and a brake pedal is depressed, the start/stop system may cause the engine to turn off instead of idling.

In certain implementations, the start/stop system may cause the internal combustion engine to turn on in response to a gear shifter being positioned in a reverse gear position. Many vehicles use gear shifters having linear gear positions, so that in order to get to a park gear position from a drive gear position, the gear shifter must pass through the reverse gear position. Accordingly, when a vehicle is being parked, the engine may be unnecessarily turned on as the gear shifter is positioned in the reverse gear position. Therefore, a need exists for systems and methods to prevent an engine restart as a vehicle is parked.

SUMMARY

The present disclosure relates to a system and method for preventing unwanted engine restarts of a vehicle utilizing a start/stop system.

What is described is a system for controlling an engine of a vehicle. The system includes a gear shifter having a gear selection sensor configured to determine a selected gear position. The system also includes a proximity sensor configured to detect object data within a predetermined area of the vehicle. The system also includes a controller coupled to the gear shifter and the proximity sensor and configured to control the engine based on the selected gear position and the object data.

Also described is a system for preventing restarts of an engine of a vehicle having a start/stop system as a gear shifter of the vehicle is positioned in a reverse gear position. The system includes a proximity sensor configured to detect an object within a predetermined area of the vehicle. The system also includes a controller coupled to the proximity sensor and configured to prevent the engine of the vehicle from starting when the engine is off, the gear shifter is in the reverse gear position and the proximity sensor detects the object.

Also described is a method for preventing an engine of a vehicle having a start/stop system from restarting as a gear shifter is positioned in a reverse gear position. The method includes detecting, by a gear selection sensor, whether the gear shifter is in the reverse gear position. The method also includes detecting, by a proximity sensor, an object within a predetermined area of the vehicle. The method also includes determining, by a controller, that the engine should be off when the gear shifter is in the reverse gear position and the object is detected.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

FIG. 6B is a state chart illustrating whether an engine is on or off based on a state of a vehicle according to some embodiments of the present disclosure;

DETAILED DESCRIPTION

Many automatic transmission and hybrid vehicles include a gear shifter having a reverse gear position between a drive gear position and a park gear position. Accordingly, the gear shifter must be positioned in the reverse gear position momentarily as the vehicle is transitioned from the drive gear position (i.e., a drive state) to the park gear position (i.e., a park state). Traditional start/stop systems implemented by controllers of vehicles may cause the engine to restart as the gear shifter of the vehicle is positioned in the reverse gear position as the vehicle is transitioned from the drive state to the park state.

The present disclosure provides systems and methods for preventing these engine restarts. These engine restarts may cause fuel of the vehicle to be unnecessarily combusted. Additionally, in response to the engine restarting as the vehicle is being parked, the engine must be turned off again, which may be an undesirable action. Preventing these engine restarts advantageously improves fuel efficiency and allows for a more predictable and desirable driving and parking experience.

The present disclosure utilizes data from one or more proximity sensors located on the front, back and/or sides of the vehicle. The proximity sensors are used to detect object data (e.g., other vehicles) near the vehicle. Using the object data, a controller is used to determine or predict whether the vehicle is in a parking space. For example, if at least one of the proximity sensors detects another vehicle in close proximity, the controller may prevent the engine from restarting as the gear shifter is positioned in the reverse gear position. The proximity sensors detecting another vehicle in close proximity may indicate that the vehicle is in a parking space or ready to be parked or shut off. The proximity sensors may also detect other objects such as parking meters, parking lines or curbs which indicate that the vehicle is in a parking space. If no object is detected by the proximity sensors, then the controller may allow the engine to restart in response to the gear shifter being positioned in the reverse gear position.

Figure 1A:
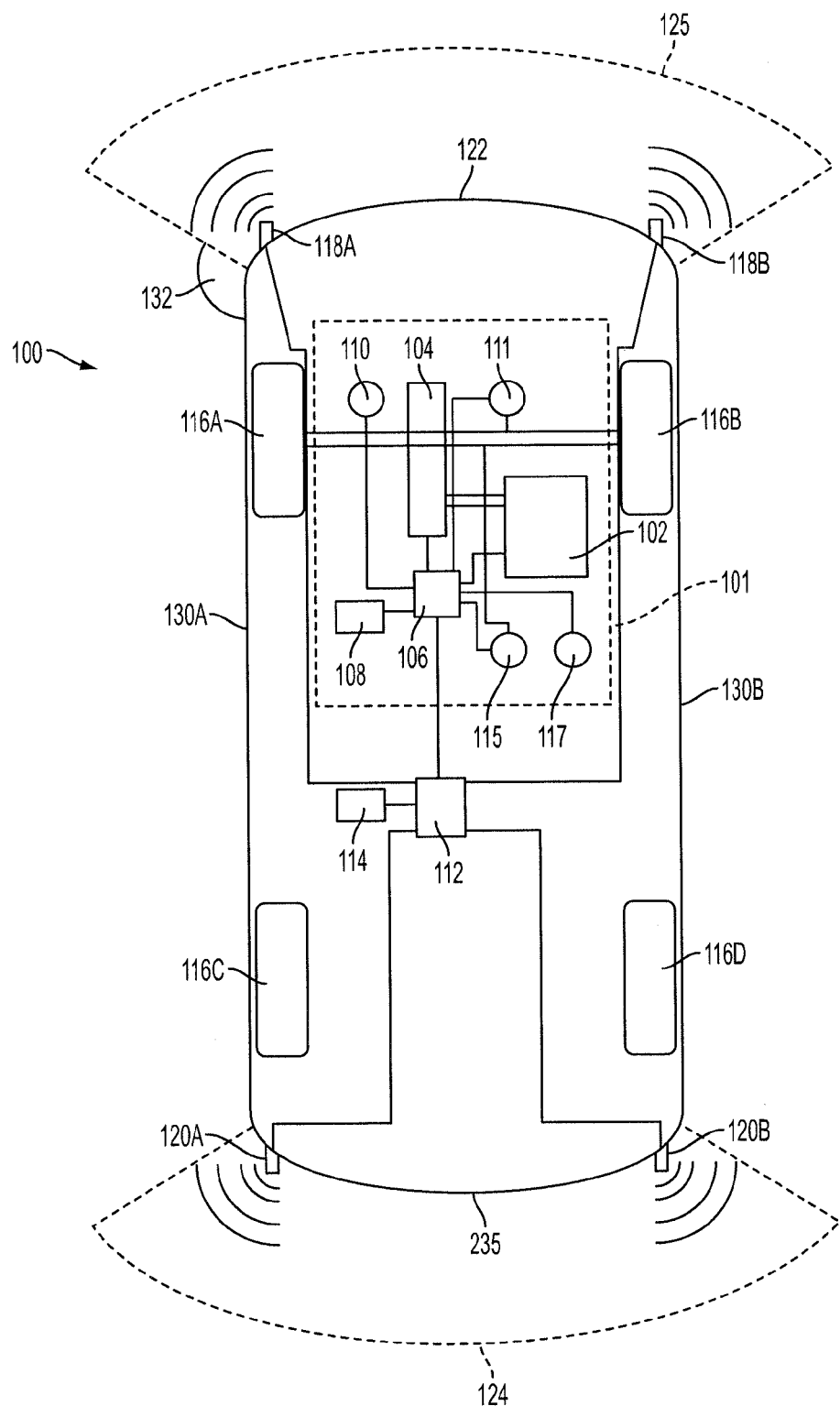
FIG. 1A illustrates a block diagram of a vehicle according to some embodiments of the present disclosure.

FIG. 1A illustrates a block diagram of a vehicle 100 according to some embodiments of the present disclosure. The vehicle 100 includes a drive force unit 101, a main electronic control unit (ECU) 112 coupled to a memory 114, wheels 116A-D, front proximity sensors 118A and 118B and rear proximity sensors 120A and 120B.

The drive force unit 101 is configured to generate a rotational force that causes the wheels 116A-D to rotate and in turn cause vehicle 100 to move relative to a road surface. The drive force unit 101 includes an engine 102, a transmission 104, an engine ECU 106, a memory 108, a gear shifter 110, a braking system 111, a speedometer 115 and an inertial measurement unit (IMU) 117. In some embodiments, the drive force unit 101 may include additional components and/or may not include some of the components illustrated in FIG. 1A.

The engine 102 may be an internal combustion engine, a fuel cell engine or any other type of engine configured to convert a fuel into a mechanical force. The engine 102 may be replaced by a battery and a motor/generator that generates the mechanical force. In some embodiments, the vehicle 100 may include the engine 102, the battery and the motor/generator resulting in a hybrid vehicle. The mechanical force is then transferred to the wheels 116 via the transmission 104.

The transmission 104 can be a continuous variable transmission (CVT).

The engine ECU 106 is coupled to the gear shifter 110, the engine 102, the braking system 111, the speedometer 115 and the IMU 117. The engine ECU 106 may be a controller or processor, such as an ASIC, a DSP, an FPGA or the like. The engine ECU 106 controls the operations of the engine 102 and the transmission 104 based on received inputs. The inputs may include a current gear position detected by the gear shifter 110, a braking signal detected by the braking system 111, a current speed detected by the speedometer 115, and an acceleration or other positioning data detected by the IMU 117.

The engine ECU 106 may include a start/stop system having a start/stop switch that can be activated and deactivated by the driver. The start/stop system may cause the engine 102 to turn off instead of idling in certain situations. For example, when the start/stop system is activated, the start/stop system may cause the engine 102 to shut off in response to a combination of a depression of a brake pedal of the vehicle 100 and the vehicle 100 reaching or being at or below a predetermined speed. In some embodiments, the predetermined speed may be any speed between 0 miles per hour (mph) and 30 mph. In some embodiments, the predetermined speed may be any speed between 10 mph and 20 mph. In some embodiments, the start/stop system may cause the engine 102 to turn off in response to a combination of a depression of the brake pedal and the vehicle 100 being substantially stopped (i.e., having a speed of less than 5 mph). In one embodiment, the predetermined speed is 0 mph. The start/stop system may cause the engine 102 to restart in response to a release of the brake pedal and/or as the gear shifter 110 is positioned in a new gear position, such as the reverse gear position.

The memory 108 is configured to store machine-readable instructions which may be performed by the engine ECU 106. The memory 108 may include databases and/or other storable information.

The gear shifter 110 may be used to control the operations of the transmission 104. In some embodiments, the gear shifter 110 may be a shifter for an automatic transmission, such that the gear shifter 110 includes a number of gear positions and the engine ECU 106 controls the transmission 104 based on a selected gear position. The number of gear positions may include one or more drive gear positions, a reverse gear position, a neutral gear position and a park gear position. In some embodiments, the reverse gear position is positioned between the drive gear position and the park gear position. In these embodiments, the gear shifter is positioned in the reverse gear position as the gear shifter 110 is transitioned from the drive gear position to the park gear position.

Figure 1B:
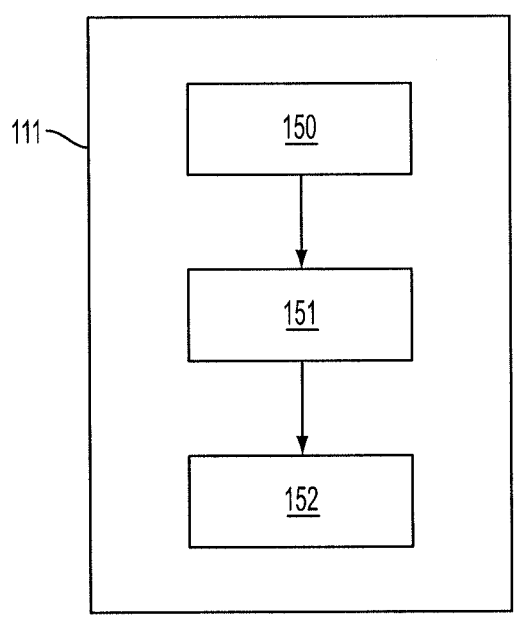
FIG. 1B illustrates a block diagram of a brake system of the vehicle of FIG. 1A according to some embodiments of the present disclosure.

With reference to FIG. 1B, a block diagram of the braking system 111 is illustrated. The braking system 111 may include a brake request sensor 151 that is configured to receive a user input from a brake pedal 150 and transmit an output corresponding to the user input. The brake request sensor 151 is used to measure an amount of force applied by the driver using the brake pedal 150. A user brake request may be detected by the brake request sensor 151 and, in response, the brake request sensor 151 may generate a braking request signal. The braking request signal may indicate a desired amount of braking. In some embodiments, the braking request signal may include a constant signal, a periodic signal, a varying signal, a linear signal or the like.

The braking system 111 may also include a brake force generator 152. The brake force generator 152 may include components adapted to apply a braking force to the vehicle based on the braking request signal. For example, the braking system 111 may include a rotor coupled to at least one wheel of the vehicle 100 and an actuator configured to compress the rotor, causing the rotational speed of the wheels 116A-D to be reduced.

Returning to FIG. 1A, the speedometer 115 may be configured to detect a speed of the vehicle 100. The IMU 117 is configured to detect an acceleration or other positioning data of the vehicle 100. In some embodiments, the detected acceleration or positioning data may be converted into a linear speed signal and/or a rotational speed signal so that the IMU 117 may replace or supplement the speedometer 115.

The proximity sensors 118A and 118B are positioned on a front 122 of the vehicle 100. The proximity sensors 118A and 118B may be any type of proximity sensor, such as capacitive, Doppler effect, eddy current, radar, sonar or the like. In some embodiments, the proximity sensors 118A and 118B may include a camera, an infrared sensor or other sensor capable of detecting objects and/or capturing object data proximate to the vehicle 100. The proximity sensors 118A and 118B may detect and/or capture object data within a predetermined area 125 of the proximity sensors 118A and 118B or the vehicle 100 and generate a signal indicating the object data. The object data may be data representing a vehicle, a vehicle bumper, a curb, a raised surface, a solid and/or dashed parking line, a sidewalk, a trash can, a street light, a parking meter or the like.

The area 125 extends forward from the front 122 of the vehicle 100 and may extend to the sides of the vehicle 100. In some embodiments, the proximity sensor 118A is positioned such that it detects objects forward and left of the vehicle 100. Accordingly, the area 125 extends at an angle 132 that is less than or equal to 180 degrees from the left side 130A of the vehicle 100. Similarly, in some embodiments, the proximity sensor 118B is positioned such that it detects objects forward and right of the vehicle 100. Accordingly, the area 125 extends at an angle that is less than or equal to 180 degrees from the right side 130B of the vehicle 100.

The proximity sensors 120A and 120B are positioned on a rear 235 of the vehicle 100. The proximity sensors 120A and 120B may be similar to or the same as the proximity sensors 118A and 118B on the front 122 of the vehicle 100. The proximity sensors 120A and 120B may detect objects or capture object data within an area 124 that may have the same or different dimensions than the area 125.

A vehicle according to the present disclosure may have any number of proximity sensors or other sensors that are located on the front, back and/or sides of the vehicle 100 and adapted to detect and/or capture object data in any direction from the vehicle 100. For example, the proximity sensors can detect object data such as parking lines on the ground.

The main ECU 112 is coupled to the proximity sensors 118A and 118B and the proximity sensors 120A and 120B. The main ECU 112 may determine whether an object is within the area 125 or the area 124 based on input received from the proximity sensors 118A and 118B and/or the proximity sensors 120A and 120B. As described below, the engine ECU 106 and the main ECU 112 may operate in tandem to prevent an inefficient and undesirable restart of the engine 102 as the gear shifter 110 is repositioned from the drive gear position to the park gear position.

Figure 2:
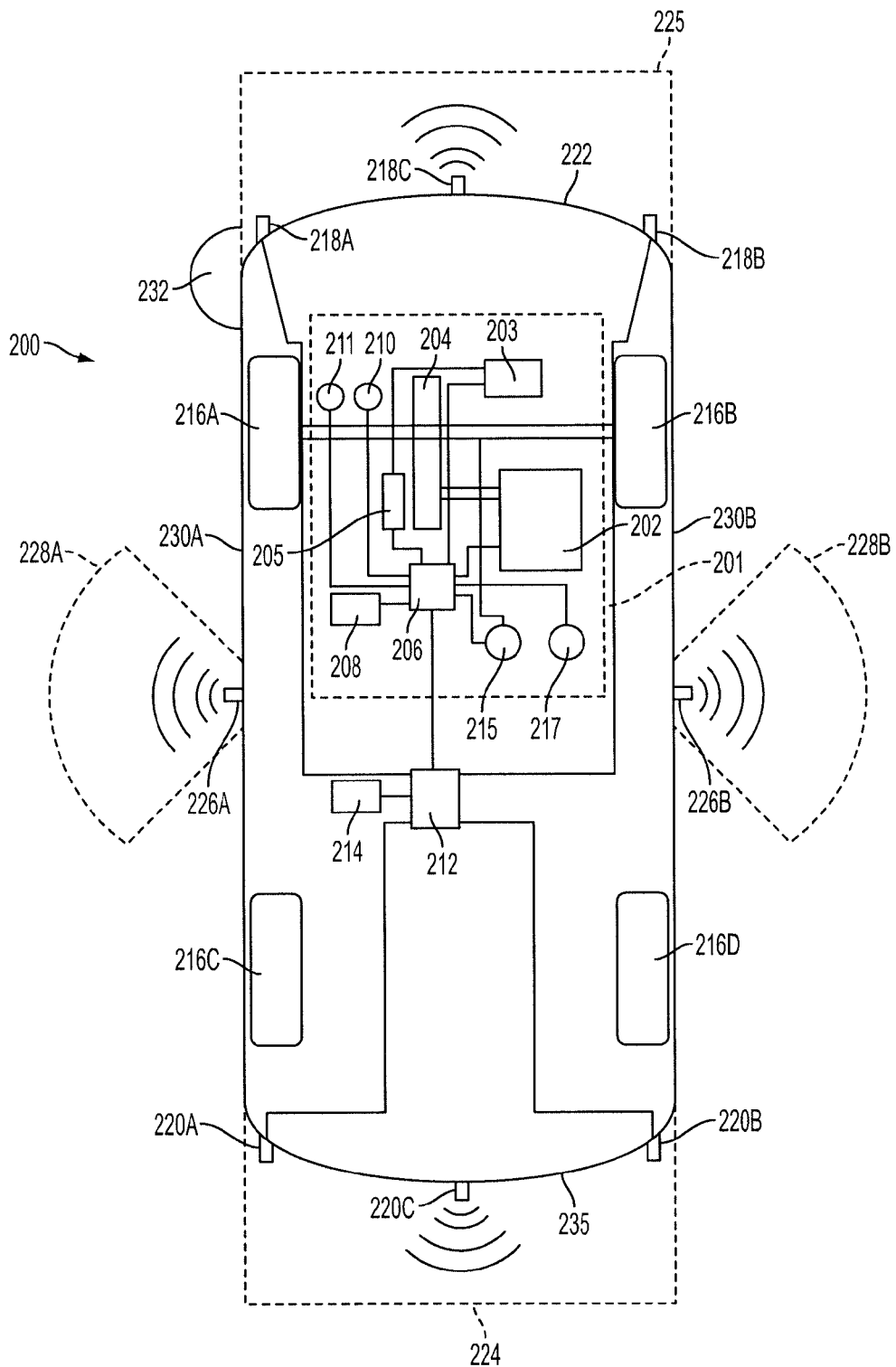
FIG. 2 illustrates a block diagram of a vehicle having similar capabilities as the vehicle illustrated in FIG. 1A according to some embodiments of the present disclosure.

FIG. 2 illustrates a vehicle 200 having similar capabilities as the vehicle 100. The vehicle 200 includes a drive force unit 201, a main ECU 212, a memory 214 coupled to the main ECU 212, proximity sensors 218A, 218B and 218C, proximity sensors 220A and 220B and proximity sensors 226A and 226B. Unlike the vehicle 100, the vehicle 200 is a hybrid vehicle. Mechanical force may be generated by both the engine 202, as described with respect to the engine 102, and a motor generator 205. The motor generator 205 is coupled to and receives electrical energy from a battery 203 and converts the energy into mechanical force, which may be transferred to the wheels 216A-D.

The drive force unit 201 includes a brake system 211, a gear shifter 210, a speedometer 215, an IMU 217, an engine ECU 206 and a memory 208 that functions similarly or the same as the related components of the vehicle 100. The engine ECU 206 may be similar to the engine ECU 106 and additionally control the motor generator 205 and/or the battery 203.

The engine ECU 206 includes a start/stop system for preventing undesired idling of the engine 202. The start/stop system may operate in a similar manner as the start/stop system of the vehicle 100. In some embodiments, the start/stop system of the vehicle 200 may control only the engine 202 of the vehicle 200 or it may control both the engine 202 and the motor generator 205.

The vehicle 200 includes three proximity sensors 218A-C positioned on a front 222 of the vehicle 200. The proximity sensors 218A-C may detect objects within an area 225 in front of the vehicle 200 but not to the sides of the vehicle 200. The vehicle 200 also includes three proximity sensors 220A-C positioned on a rear 235 of the vehicle 200. The proximity sensors 220A-C may detect objects within an area 224 behind the vehicle 200. The area 224 may be similar in size and shape to the area 225 or the area 224 may have a different shape and size than the area 225.

The vehicle 200 also includes a proximity sensor 226A positioned on a left side 230A of the vehicle 200 and a proximity sensor 226B positioned on a right side 230B of the vehicle 200. The proximity sensor 226A may detect objects to the left of the vehicle 200 within an area 228A and the proximity sensor 226B may detect objects to the right of the vehicle 200 within an area 228B. The size and/or shape of the areas 224, 225 and 228 may vary based on the type and/or quantity of proximity sensors.

The main ECU 212 may be coupled to the engine ECU 206 and to the proximity sensors 218, 220 and 226. Operating in tandem, the engine ECU 206 and the main ECU 212 may prevent undesirable restarts of the engine 202 as a gear shifter is positioned in a reverse gear position during a transition from a drive gear position to a park gear position.

Figure 3:
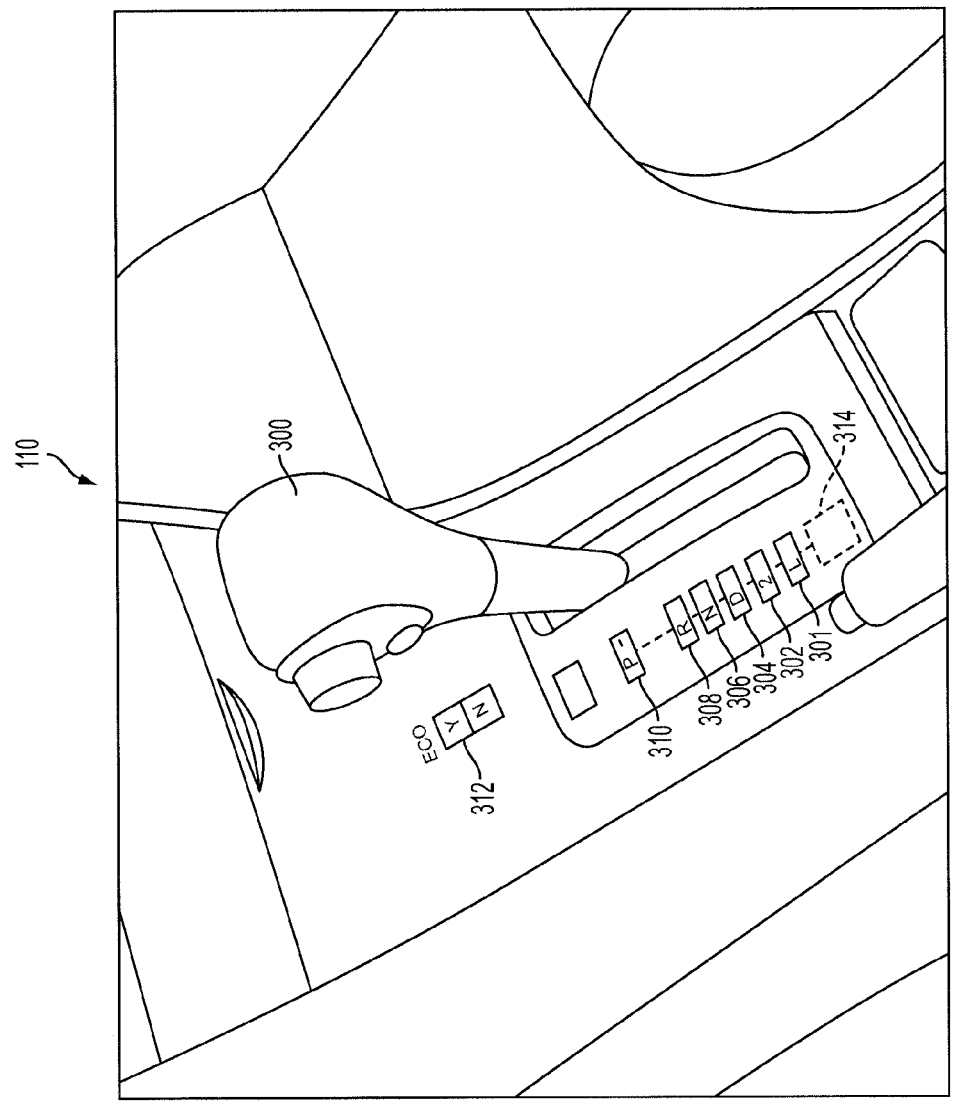
FIG. 3 illustrates a gear shifter of the vehicle of FIG. 1A according to some embodiments of the present disclosure.

FIG. 3 illustrates a gear shifter 110 of the vehicle 100. The vehicle 200 may include a gear shifter similar to the gear shifter 110. The gear shifter 110 includes a selector 300 adapted to be positioned in one of multiple gear positions. A gear selection sensor 314 may be coupled to the selector 300 and/or each of the gear positions. The gear selection sensor 314 may determine in which gear position the selector 300 is positioned and transmit the determined or selected gear position to the engine ECU 106.

The gear positions include an L (low) gear position 301, a 2 gear position 302, a D (drive) gear position 304, an N (neutral) gear position 306, an R (reverse) gear position 308 and a P (park) gear position 310. As will be readily apparent, this disclosure may be applied to any vehicle having at least three gear positions. Similarly, this disclosure may be applied to vehicles having semiautomatic transmissions, manumatic transmissions, continuously variable transmissions or the like.

Each of the gear positions corresponds to a different operation of the transmission 104. The P gear position 310 is associated with a park mode, during which the transmission 104 may not transmit any power to the wheels 116 and/or a force may be applied to the wheels 116 to reduce or prevent the ability of the wheels 116 to rotate. The R gear position 308 is associated with a reverse mode, during which the transmission 104 may cause the vehicle 100 to move in a backwards direction. The N gear position 306 is associated with a neutral mode, during which the transmission 104 may not transmit power to the wheels 116 but the wheels 116 may rotate. The D gear position 304 is associated with a drive mode, during which the transmission 104 may cause the vehicle to move in a forward direction. The engine ECU 106 may determine an optimal gear while the D gear position is selected. The optimal gear selected by the engine ECU 106 may be determined based on fuel economy, performance, power or the like. The 2 gear position 302 is associated with a lower gear mode, during which the transmission 104 will cause the vehicle to move in a forward direction in a lower gear than during the D gear position 304. The L gear position 301 is associated with a lower gear mode than the 2 gear position.

The vehicle 100 may also include an economy select button 312. The economy select button 312 may be coupled to the engine ECU 106. When the economy select button 312 is set to an "on" position, the gear selection by the engine ECU 106 may corresponds to increased fuel economy. In some embodiments, the start/stop system of the vehicle 100 is only performed by the engine ECU 106 while the economy select button 312 is set to the "on" position.

Figure 4:
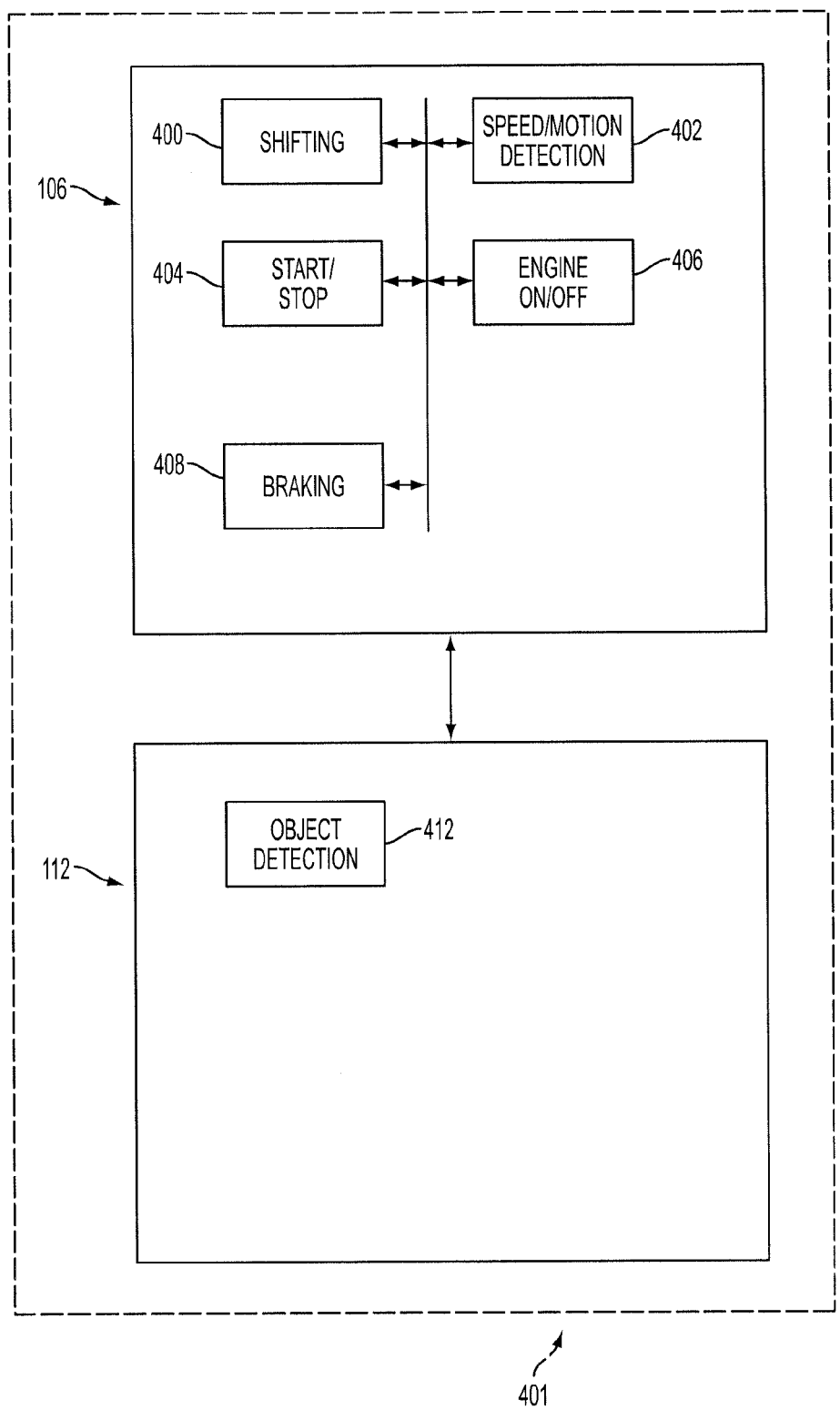
FIG. 4 illustrates a block diagram of a controller of the vehicle of FIG. 1A according to some embodiments of the present disclosure.

FIG. 4 illustrates a block diagram of a controller 401 of the vehicle 100. The controller 401 may include the engine ECU 106 and/or the main ECU 112. A controller of a vehicle according to the present disclosure may include greater or fewer modules than illustrated in FIG. 4. Additionally, some of the modules may be combined, some of the modules may be split, etc.

The function of the controller 401 may be performed by hardware, software or a combination of hardware and software. The instructions may be wholly or partially stored within the controller 401, the memory 108 and/or the memory 114.

The engine ECU 106 may include a shifting module 400, a speed/motion detection module 402, a start/stop module 404, an engine on/off module 406 and a braking module 408. Each of the modules may be in electrical (wired or wireless) communications with one another.

The shifting module 400 may receive a signal from the gear shifter 110 indicating the selected gear position. The shifting module 400 may determine a gear of the transmission 104 based on the selected gear position and cause the transmission 104 to operate in the determined gear.

The speed/motion detection module 402 may be coupled to the speedometer 115 and/or the IMU 117. The speed/motion detection module 402 may determine a vehicle speed, a direction of motion or travel, acceleration, a rotational speed or the like based on the signal received from the speedometer 115 and/or the IMU 117.

The braking module 408 may receive a signal from the braking system 111 indicating an amount of braking desired by a driver (i.e., an amount of depression applied to the brake pedal). The braking module 408 may determine whether or not braking force should be applied by braking system 111, and if so, how much braking force should be applied. Based on the amount of braking requested by the driver, the braking module 408 may instruct the braking system 111 to apply the braking force.

The object detection module 412 of the main ECU 112 may be coupled to one or more of the proximity sensors 118 and 120. If one of the proximity sensors 118 and/or proximity sensors 120 detects an object within the area 125 and/or the area 124, the proximity sensor that detects the object may transmit a signal to the object detection module 412. The signal may be a constant signal, a period signal or a combination of constant and periodic. In some embodiments, the proximity sensors may transmit a signal to the main ECU 112 when no object is detected and cease transmitting the signal when an object is detected. In some embodiments, the proximity sensor may constantly or periodically transmit a signal indicating whether an object is or is not detected.

The proximity sensors may be capable of detecting size, mass, opaqueness, density, relative motion (i.e., whether the detected object is moving relative to the vehicle 100) or the like of objects. The object data may be transmitted to the object detection module 412, which may include logic that determines whether a detected object satisfies predetermined qualities based on the detected measures of size, mass, opaqueness, density, relative motion or the like. By comparing the object to predetermined qualities, reporting of objects that don't necessarily indicate that the vehicle 100 is parking, such as insects, fog or the like, may be reduced. In response to the object satisfying the predetermined qualities, the object detection module 412 may generate a signal indicating that the object has been detected. The object detection module 412 may also compare the detected or captured object data from the proximity sensors to stored object data to determine or create a match for more accurate identification of the detected or captured object data.

The start/stop module 404 includes the start/stop logic. With references to FIGS. 3 and 4, when the economy select button 312 is not set to economy mode, the start/stop module 404 may or may not perform any functions. Based on inputs, such as a selected gear position from the gear shifter 110, a speed or motion signal from the speed/motion detection module 402, a braking signal from the braking module 408, and/or an object detection signal from the object detection module 412 of the main ECU 112, the start/stop module 404 may determine whether to start or stop the engine 102. In response to this determination, the start/stop module 404 may generate a signal to be received by the engine on/off module 406.

The start/stop module 404 may determine that the engine 102 should be turned off when the vehicle 100 is stopped or at or below a predetermined threshold (e.g., speed) and the brake pedal is depressed. The start/stop module 404 may determine that the engine 102 should be restarted when no object is detected and the gear shifter 110 is in the reverse gear position 308. In some embodiments, the start/stop module 404 may determine that the engine 102 should be restarted when no object is detected, the gear shifter 110 is in the reverse gear position 308 and the brake pedal is not depressed. The start/stop module 404 may determine that the engine 102 should remain off when an object is detected and the gear shifter 110 is in the reverse gear position 308. In some embodiments, the start/stop module 404 determine that the engine 102 should remain off when an object is detected, the gear shifter 110 is in the reverse gear position 308 and the brake pedal has not been depressed.

The vehicle 100 may include a sensor capable of detecting image data similar to the proximity sensors, such as a camera. The sensor may detect image data and the controller 401 may identify an object based on the image data. The object may include a curb, another raised surface, a solid and/or dashed parking line, a sidewalk, a trash can, a street light, a parking meter or the like. The start/stop module 404 may be adapted to determine whether the engine 102 should or should not restart in response to the reverse gear position 308 being selected based on the identification of and/or the location of the object. For example, if a solid parking line, a parking meter, a trash can, etc. is detected adjacent to the vehicle 100, then the start/stop module 404 may determine that the vehicle 100 is in a parking spot and the engine 102 should not restart in response to the reverse gear position 308 being selected. If a double yellow line is detected adjacent the vehicle 100, the start/stop module 404 may determine that the vehicle 100 is not in a parking spot and should restart in response to the reverse gear position 308 being selected.

The engine on/off module 406 may include logic for starting and stopping the engine 102. For example, in response to certain inputs, such as an input received from the start/stop module 404, the engine on/off module 406 may cause the engine 102 to start or stop.

Figure 5:
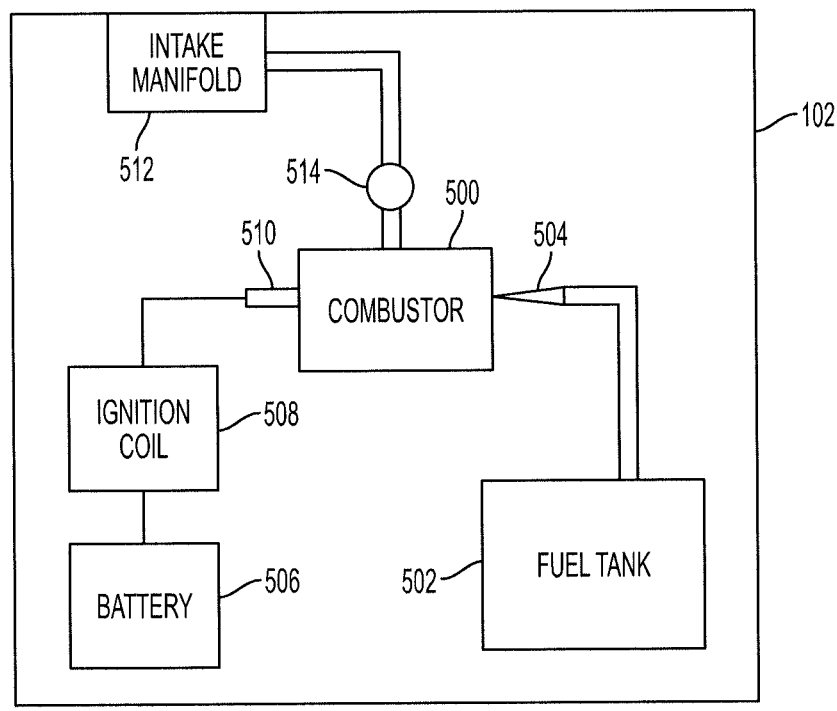
FIG. 5 illustrates a simplified block diagram of the engine of the vehicle of FIG. 1A according to some embodiments of the present disclosure.

FIG. 5 illustrates a simplified block diagram of the engine 102. The engine 102 includes a combustor 500 wherein fuel and oxygen are combusted to generate mechanical force.

The engine 102 also includes an intake manifold 512 configured to receive oxygen. A throttle 514 is coupled to the intake manifold 512 and to the combustor 500. The throttle 514 may adjust an amount of oxygen provided to the combustor 500. By significantly or completely eliminating oxygen from the combustor 500, combustion may be prevented, effectively stopping the engine 102. By increasing an amount of oxygen provided to the combustor 500, the engine 102 may be started.

A fuel tank 502 defines a volume that contains a fuel to be combusted in the combustor 500. A fuel injector 504 receives fuel from the fuel tank 502 and provides fuel to the combustor 500. An amount of fuel provided by the fuel injector 504 to the combustor 500 may be adjusted. By significantly or completely eliminating fuel from the combustor 500, combustion may be prevented, effectively stopping the engine 102. By increasing an amount of fuel provided to the combustor 500, the engine 102 may be started.

The engine 102 may also include a battery 506 for storing electrical energy. An ignition coil 508 may be coupled to the battery 506 and generate bursts of electrical energy. A spark plug 510 may be configured to receive this energy from the ignition coil 508 and provide a spark to the combustor 500 causing the mixture of fuel and air to combust. A spark plug 510 may be prevented from generating a spark. By eliminating the spark plug 510 from generating a spark, combustion may be prevented, effectively stopping the engine 102. Similarly, by preventing the ignition coil 508 from generating a burst of energy, combustion may be prevented, effectively stopping the engine 102. By allowing the spark plug 510 and the ignition coil 508 to function, the engine 102 may be started.

With reference to FIGS. 4 and 5, the engine on/off module 406 may transmit a signal to the throttle 514, the fuel injector 504 and/or the spark plug 510. Instead of or in addition to the spark plug 510, the engine on/off module 406 may transmit a signal to the ignition coil 508. The engine on/off module 406 may cause the engine to start and/or stop based on instructions provided to the throttle 514, the fuel injector 504, the spark plug 510 and/or the ignition coil 508. In some embodiments, the engine 102 may include additional components and/or a different configuration such that the engine on/off module 406 may cause the engine 102 to turn on and/or off in a different manner than described above.

Figure 6A:
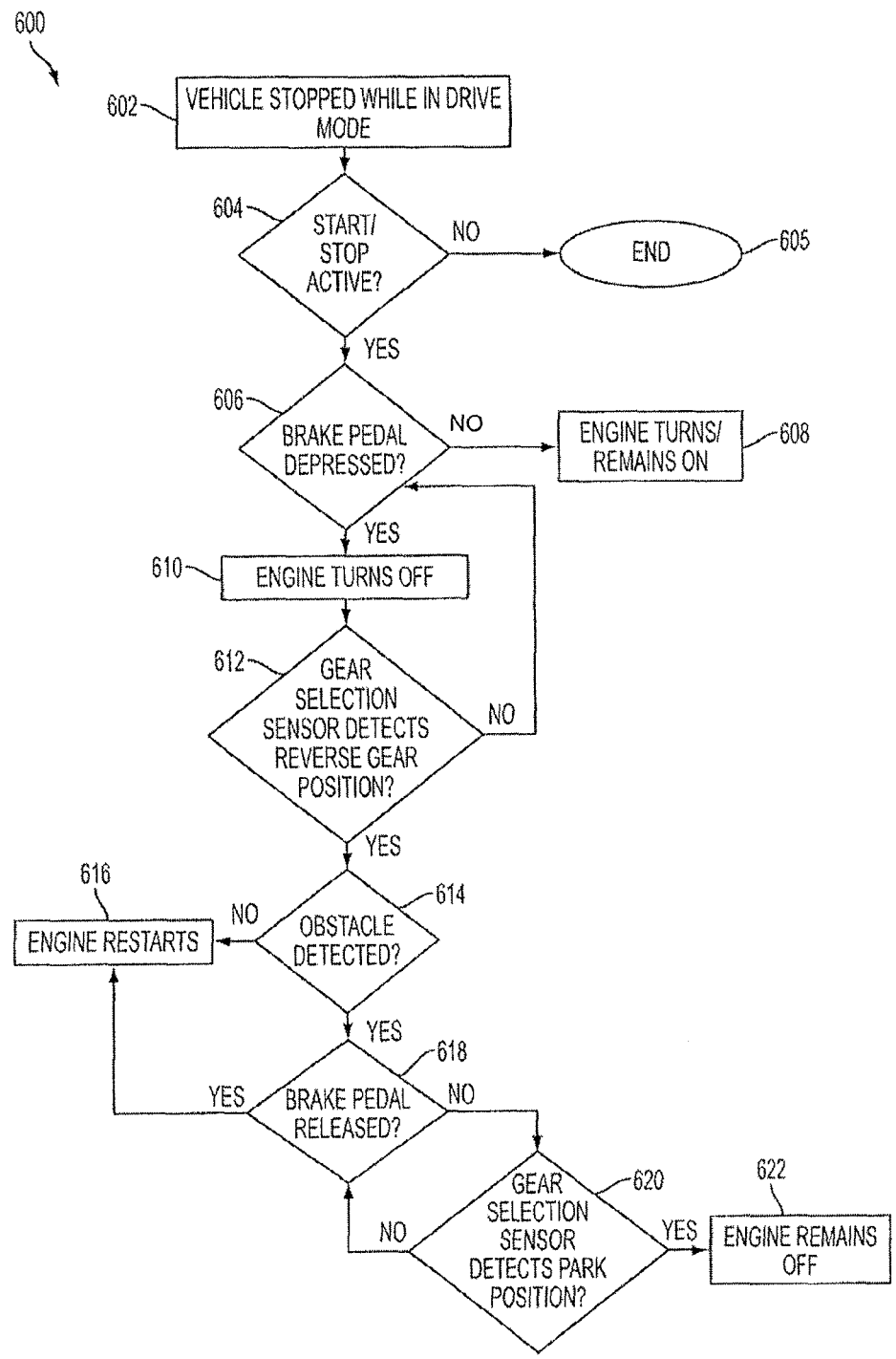
FIG. 6A illustrates a method to be performed by the controller illustrated in FIG. 4 according to some embodiments of the present disclosure.

FIG. 6A illustrates a method 600 to be performed by the controller 401. Each block of the method 600 may be performed by the engine ECU 106 and/or the main ECU 112 (i.e., the controller 401).

The controller 401 may receive a speed or positioning signal from the speedometer 115 and/or the IMU 117. In some embodiments, this signal may be constantly provided to the controller 401, the signal may be periodically transmitted to the controller 401 and/or the signal may only be transmitted to the controller 401 in response to certain criteria, such as the speed reaching the predetermined speed. In block 602, the controller 401 may receive a signal indicating that the vehicle 100 has stopped or reached the predetermined speed.

In block 604, the controller 401 determines whether the start/stop system of the vehicle 100 is active. This may be determined based on the setting of the economy select button 312 of FIG. 3, the start/stop switch, the start/stop module 404 or another source. If the start/stop system is not active then the method 600 may end in block 605.

In block 606, the controller 401 determines whether a brake request is being generated, such as by a depression of the brake pedal 150. If no brake request or a minor brake request (such as within a bottom 15% of full braking power) is generated, then the engine may remain on in block 608. If a brake request (or more than a minor brake request) is generated, then the start/stop module 404 may determine that the engine should be turned off. The start/stop module 404 may generate a signal based on this determination and transmit the signal to the engine on/off module 406. In response to receiving the signal, the engine on/off module 406 may instruct the engine to turn off via the throttle 514, the fuel injector 504 and/or the spark plug 510.

In block 612, the controller 401 determines whether the reverse gear position 308 has been selected. If the reverse gear position 308 has not been selected, then the method may return to block 606 in which the controller 401 determines whether a brake request is being generated. If no brake request is being generated, then the controller 401 may cause the engine to turn on or restart in block 608.

If the reverse gear position 308 has been selected, then in block 614, the controller 401 determines whether an obstacle or an object has been detected. This may be determined based on a signal received at the object detection module 412 from any of the proximity sensors. The object detection may be limited to the detection of only objects that indicate the vehicle 100 is in a parking spot or parked.

If no object is detected, the controller 401 may cause the engine to restart in block 616. If an obstacle is detected, the controller 401 may cause the engine 102 to remain off, such as by controlling the throttle 514, the spark plug 510, the ignition coil 508 and/or the fuel injector 504.

In block 618, the controller 401 determines whether a brake request signal is being generated. If a brake control signal is being generated in block 618, the method 600 may proceed to block 620, where the controller 401 determines whether the park gear position 310 is selected based on a signal received at the shifting module 400 from the gear selection sensor 314. If the controller 401 determines that the park gear position 310 has been selected, the controller 401 causes the engine 102 to remain off in block 622. If the gear selection sensor 314 determines that the park gear position 310 is not selected, then the method 600 returns to block 618 where the controller 401 determines whether a brake request signal is being generated. If a brake request is not being generated, the method 600 returns to block 616 in which the controller 401 may cause the engine 102 to restart.

In some embodiments, the method 600 may not include block 618 such that in response to a yes determination in block 614, the engine 102 remains off unless pressure is applied to a gas pedal of the vehicle 100.

A similar method may be performed by a controller of the vehicle 200. In a hybrid vehicle, the engine may remain off based on a determination by the controller of the hybrid vehicle performed similar to the method 600. Similarly, power production from a motor generator of the vehicle may be terminated in response to the determination. In some embodiments, the motor generator may still generate power while the engine remains off.

FIG. 6B is a state chart illustrating whether the engine 102 is on or off based on the state of the vehicle 100. Row 650 corresponds to whether the speed of the vehicle 100 is below the predetermined threshold. Row 652 corresponds to whether the vehicle 100 is in a drive mode, a park mode or a reverse mode. Row 654 corresponds to whether a brake request signal is generated by the braking system 111. Row 656 corresponds to whether an object is detected by the proximity sensors. Row 658 corresponds to whether the engine 102 is on or off.

Column 660 corresponds to all states where the speed of the vehicle 100 is not below the predetermined threshold. In all of these states, the engine 102 may be on.

Column 662 corresponds to states in which the speed of the vehicle 100 is below the predetermined threshold and the vehicle 100 is in the park mode. In these states, the engine 102 may be off.

Column 664 corresponds to the state in which the speed of the vehicle is below the predetermined threshold, the vehicle is in the drive mode, the braking system 111 is not generating a brake request and no object is detected. In this state, the engine 102 may be on.

Column 666 corresponds to the state in which the speed of the vehicle is below the predetermined threshold, the vehicle is in the drive mode, the braking system 111 is not generating a brake request and an object is detected. In this state, the engine 102 may be on or off. Whether the engine 102 is on or off is based on the programming of the controller 401.

Column 668 corresponds to the state in which the speed of the vehicle is below the predetermined threshold, the vehicle is in the drive mode, the braking system 111 is generating a brake request and no object is detected. In this state, the engine 102 may be off.

Column 670 corresponds to the state in which the speed of the vehicle is below the predetermined threshold, the vehicle is in the drive mode, the braking system 111 is generating a brake request and an object is detected. In this state, the engine 102 may be off.

Column 672 corresponds to the state in which the speed of the vehicle is below the predetermined threshold, the vehicle is in the reverse mode, the braking system 111 is generating a brake request and no object is detected. In this state, the engine 102 may be on or off. Whether the engine 102 is on or off is based on the programming of the controller 401.

Column 674 corresponds to the state in which the speed of the vehicle is below the predetermined threshold, the vehicle is in the reverse mode, the braking system 111 is generating a brake request and an object is detected. In this state, the engine 102 may be off.

Column 676 corresponds to the state in which the speed of the vehicle is below the predetermined threshold, the vehicle is in the reverse mode, the braking system 111 is not generating a brake request and no object is detected. In this state, the engine 102 may be on.

Column 678 corresponds to the state in which the speed of the vehicle is below the predetermined threshold, the vehicle is in the reverse mode, the braking system 111 is not generating a brake request and an object is detected. In this state, the engine 102 may be on or off. Whether the engine 102 is on or off is based on the programming of the controller 401.

Figure 7:
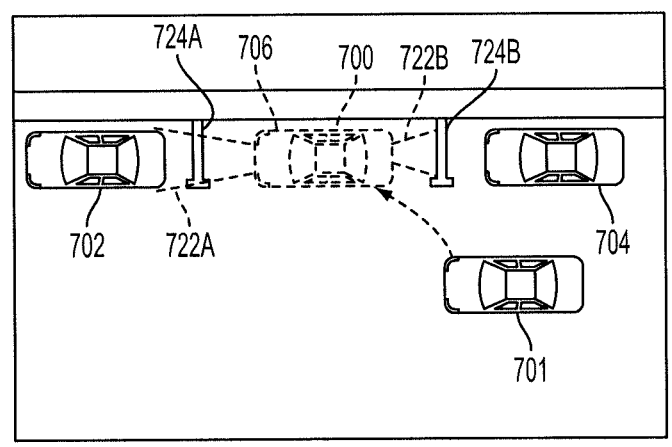
FIG. 7 illustrates a vehicle utilizing the method of FIG. 6A and including similar features as the vehicle of FIG. 1A according to some embodiments of the present disclosure.

FIG. 7 illustrates an example of a vehicle 700 utilizing the method 600 of FIG. 6A and including similar features as the vehicle 100. The vehicle 700 may initially be in a first position 701. As the vehicle 700 is moving from the first position 701 to a second position 706, the driver may depress the brake pedal, which in turn causes a brake request signal to be generated. As the vehicle is approaching a stop at the position 706, the start/stop system of the vehicle 700 may cause the engine to turn off. In position 706, proximity sensors on the front of the vehicle 700 may detect objects within an area 722A of the front of the vehicle 700. In this example, the detected object is another vehicle 702.

The vehicle 700 may also include sensors capable of detecting image data in the area 722A in front of the vehicle and an area 722B behind the vehicle. These sensors may detect a solid parking line 724A in front of the vehicle and a solid parking line 724B behind the vehicle. The vehicle 702 and/or the parking lines 724A and 724B are objects that indicate the vehicle 700 is in a parking spot.

When the vehicle 700 reaches the second position 706, a gear shifter may be repositioned from the drive gear position through the neutral gear position and the reverse gear position to the park gear position. As the gear selector is positioned over the reverse gear position, a controller of the vehicle 700 may determine that an object is within the area 722A and thus the engine should remain off unless the brake request signal ceases to be generated before the gear selector is positioned in the park gear position. In some embodiments, the controller may identify the solid parking lines 724 and determine that the vehicle is in a parking spot and that the engine should remain off unless the brake request signal ceases to be generated before the gear selector is positioned in the park gear position. If the driver finishes shifting the gear selector into the park gear position before the brake request signal is terminated, the engine will remain off until the gear selector is again placed into the drive gear position and the brake request signal is no longer generated.

Figure 8:
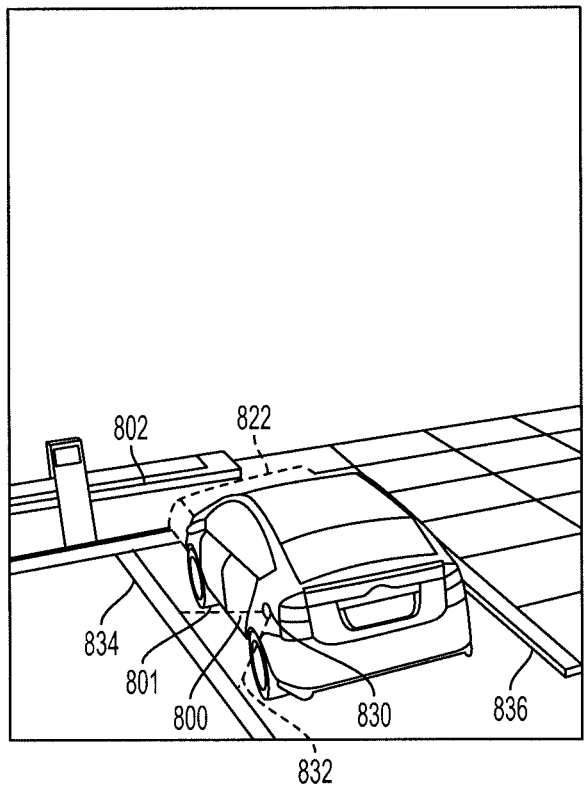
FIG. 8 illustrates a vehicle utilizing the method of FIG. 6A and including similar features as the vehicle of FIG. 1A according to some embodiments of the present disclosure.

FIG. 8 illustrates another vehicle 800 utilizing the method 600 of FIG. 6A. In FIG. 8, the vehicle 800 has come to a stop at a location 801. As the vehicle 800 is stopped in the location 801, a braking request signal is generated. Because the vehicle 800 is stopped and the brake request signal is generated, a controller of the vehicle 800 running causes the engine to turn off based on a start/stop system. As the gear selector is repositioned from the drive gear position through the neutral gear position and into the reverse gear position, proximity sensors on the front of the vehicle 800 detect the flower pots 802 within the area 822. In response to detecting the flower pots 802, the controller may cause the engine of the vehicle 800 to remain off unless a brake request signal ceases to be generated while the reverse gear position is selected.

Similarly, the vehicle 800 may include a camera 830 on a left side of the vehicle 800 capable of detecting image data in an area 832 on the left side of the vehicle 800 and/or a camera on the right side of the vehicle 800 capable of detecting image data on the right side of the vehicle 800. The camera 830 on the left of the vehicle 800 may detect a solid parking line 834 on the left of the vehicle 800. Similarly, the camera on the right side of the vehicle 800 may detect a curb 836 on the right side of the vehicle 800. In response to identifying either or both of the solid parking line 834 or the curb 836, the controller may cause the engine of the vehicle 800 to remain off unless a brake request signal ceases to be generated while the reverse gear position is selected. The flower pot 802, the parking line 834 and/or the curb 836 are objects that indicate the vehicle 800 is in a parking spot.

Figure 9:
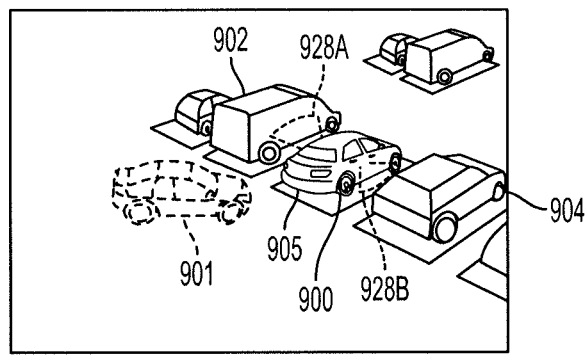
FIG. 9 illustrates a vehicle utilizing the method of FIG. 6A and including similar features as the vehicle of FIG. 2 according to some embodiments of the present disclosure.

FIG. 9 illustrates a vehicle 900, similar to the vehicle 200, parked in a location 905 and utilizing a method similar to the method 600 of FIG. 6A. When parked in the location 905, there are no objects directly in front of or behind the vehicle 900. As the vehicle 900 approaches the location 905 from the position 901, a brake pedal of the vehicle 900 may be depressed, causing a braking request signal to be generated. In response, an on/off system of the vehicle 900 may instruct the engine of the vehicle 900 to turn off as the vehicle 900 is stopped and a brake request signal is generated. Proximity sensors of the vehicle 900 may be positioned on the right side and the left side and capable of detecting objects within an area 928A on the left of the vehicle 900 and an area 928B on the right of the vehicle 900. As the gear selector is moved from the drive gear position over the reverse gear position, the proximity sensors may detect the vehicle 902 and/or the vehicle 904. Because the vehicle 902 and the vehicle 904 have been detected, a controller of the vehicle 900 may cause the engine 102 of the vehicle 900 to remain off as the gear selector is positioned in the reverse gear position unless the brake system pedal has been released. The vehicle 902 and/or the vehicle 904 are objects that indicate the vehicle 900 is in a parking spot.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing the likelihood of an unwanted restart of an engine while transitioning a vehicle having start/stop technology from drive to park, the system comprising:
   a gear shifter having a park gear position, a drive gear position and a reverse gear position;
   a proximity sensor configured to detect object data within a predetermined area of the vehicle; and
   a controller coupled to the gear shifter and the proximity sensor and configured to predict whether the vehicle is in a parking location based on the detected object data and to prevent the engine from starting when the gear shifter is in the reverse gear position and the controller predicts that the vehicle is in the parking location.

2. The system of claim 1 wherein the reverse gear position is located on a path between the park gear position and the drive gear position and wherein the controller is further configured to predict that the vehicle is in the parking location when the object data indicates that an object is within the predetermined area of the vehicle.

3. The system of claim 1 further comprising:
   a speedometer configured to detect a speed of the vehicle; and
   a brake request sensor configured to detect a braking request,
   wherein the controller is further configured to:
      cause the engine to be off when the gear shifter is in the drive gear position, the speed of the vehicle is below a predetermined threshold and the braking request is detected, and
      cause the engine to be on when the gear shifter is in the drive gear position and the braking request is not detected.

4. The system of claim 1 further comprising:
   a speedometer configured to detect a speed of the vehicle; and
   a brake request sensor configured to detect a braking request,
   wherein the controller is further configured to:
      cause the engine to be off when the gear shifter is in the drive gear position, the speed of the vehicle is below a predetermined threshold and the braking request is detected,
      cause the engine to be on when the gear shifter is in the drive gear position and the braking request is not detected, and
      cause the engine to be off when the gear shifter is in the drive gear position, the speed of the vehicle is below the predetermined threshold and an object is detected by the proximity sensor.

5. The system of claim 1 further comprising the engine, wherein the engine includes a throttle, a fuel injector and a spark plug and wherein the controller is configured to prevent the engine from starting by controlling at least one of the throttle, the fuel injector or the spark plug.

6. The system of claim 1 wherein the controller is further configured to determine whether an object included in the object data satisfies a predetermined quality including at least one of a size, an opaqueness, a mass, a density or motion of the object relative to the proximity sensor.

7. The system of claim 6 wherein the controller is configured to predict whether the vehicle is in the parking location based on whether the object satisfies the predetermined quality.

8. A system for preventing restarts of an engine of a vehicle having a start/stop system as a gear shifter of the vehicle is shifted from a drive gear position to a park gear position, the system comprising:
   a proximity sensor configured to detect object data corresponding to an object within a predetermined area of the vehicle; and
   a controller coupled to the proximity sensor and configured to predict whether the vehicle is in a parking location based on the detected object data and to prevent the engine from starting when the gear shifter is in a reverse gear position and the controller predicts that the vehicle is in the parking location.

9. The system of claim 8 further comprising a brake request sensor configured to generate a braking request signal in response to a braking request and wherein the controller is further configured to prevent the engine from starting when the engine is off and the braking request signal is generated.

10. The system of claim 9 further comprising a speedometer configured to detect a speed of the vehicle and wherein the controller is further configured to:
    cause the engine of the vehicle to turn off when the gear shifter is in the drive gear position, the speed of the vehicle reaches a predetermined threshold and the braking request signal is generated; and
    cause the engine of the vehicle to turn on when the gear shifter is in the drive gear position and the braking request signal is not being generated.

11. The system of claim 10 wherein the predetermined threshold is between 0 mph and 30 mph.

12. The system of claim 8 further comprising the engine, wherein the engine includes a throttle, a fuel injector and a spark plug and the controller is configured to prevent the engine from starting by controlling at least one of the throttle, the fuel injector or the spark plug.

13. The system of claim 8 wherein the controller is further configured to determine whether the object satisfies a predetermined quality including at least one of a size, an opaqueness, a mass, a density or a relative motion.

14. The system of claim 13 wherein the controller is configured to predict that the vehicle is in a parking location when the object satisfies the predetermined quality.

15. A method for preventing an engine of a vehicle having a start/stop system from restarting as a gear shifter is shifted from a drive gear position to a park gear position, the method comprising:
  detecting, by a gear selection sensor, that the gear shifter is in a reverse gear position;
  detecting, by a proximity sensor, object data corresponding to an object within a predetermined area of the vehicle;
  predicting, by a controller, whether the vehicle is in a parking location based on the detected object data; and
  preventing, by the controller, the engine from starting when the gear shifter is in the reverse gear position and the controller predicts that the vehicle is in the parking location.

16. The method of claim 15 further comprising:
  detecting, by a brake request sensor, a braking request; and
  preventing, by the controller, the engine from starting when the gear shifter is in the reverse gear position, the controller predicts that the vehicle is in the parking location and the braking request is detected.

17. The method of claim 16 further comprising:
  detecting, by a speedometer, a speed of the vehicle;
  causing, by the controller, the engine to be off in response to the gear shifter being in the drive gear position, the braking request being detected and the speed of the vehicle reaching a predetermined threshold; and
  causing, by the controller, the engine to be on when the gear shifter is in the drive gear position and the braking request is not detected.

18. The method of claim 17 wherein the predetermined threshold is between 0 mph and 30 mph.

19. The method of claim 15 wherein preventing the engine from starting includes controlling, by the controller, at least one of a throttle, a fuel injector or a spark plug of the engine.

20. The method of claim 15 further comprising detecting, by the proximity sensor, at least one of a size, an opaqueness, a mass, a density or a relative motion of the object and wherein predicting whether the vehicle is in the parking location is further based on the at least one of the size, the opaqueness, the mass, the density or the relative motion of the object.

\* \* \* \* \*